United States Patent [19]
Den Boer et al.

[11] Patent Number: 5,993,894
[45] Date of Patent: Nov. 30, 1999

[54] METHOD OF MANUFACTURING A CONDUCTIVE LAYER ON A SUBSTRATE

[75] Inventors: Johannes H. W. G. Den Boer; Claudia Mutter; Sipke Wadman; Henricus X. Willems, all of Eindhoven, Netherlands

[73] Assignee: U.S. Philips Corporation, New York, N.Y.

[21] Appl. No.: 09/065,969

[22] Filed: Apr. 24, 1998

[30] Foreign Application Priority Data

Apr. 28, 1997 [EP] European Pat. Off. ............. 97201277

[51] Int. Cl.⁶ ....................................................... B05D 5/12
[52] U.S. Cl. .......................... 427/64; 427/108; 427/126.3; 427/226; 427/341
[58] Field of Search ................................. 427/64, 126.3, 427/108, 226, 341

[56] References Cited

U.S. PATENT DOCUMENTS 4,252,841  2/1981  Kinugawa et al. ..................... 427/108
4,614,669  9/1986  Yannopoulos ............................. 427/87

FOREIGN PATENT DOCUMENTS

0139557A1   5/1985   European Pat. Off. .
WO9529501  11/1995   WIPO .

*Primary Examiner*—Janyce Bell
*Attorney, Agent, or Firm*—Norman N. Spain

[57] ABSTRACT

A conductive layer comprising metal-oxide or metal-oxides is applied to a substrate by providing a layer comprising a metal-salt or a mixture of metal-salts on the substrate, bringing the layer into contact with an alkaline solution, and, subsequently, subjecting the layer to a thermal treatment (heating).

12 Claims, 1 Drawing Sheet

METHOD OF MANUFACTURING A CONDUCTIVE LAYER ON A SUBSTRATE

BACKGROUND OF THE INVENTION

The invention relates to a method of applying a conductive, transparent metal-oxide layer to a surface of a substrate.

Such layers are applied, inter alia, to windows of cathode ray tubes. The conductive layer has an anti-static effect and a shielding effect, that is, the intensity of the electromagnetic stray field emitted by the cathode ray tube is reduced by applying said conductive transparent layer.

A method of the type mentioned in the opening paragraph is disclosed in WO 95/29501. In said document, a description is given of a method in which a sol/gel coating of ITO (indium-tin oxide, i.e. a layer containing $SnO_2/In_2O_3$) is cured by means of a laser in a hydrogen-containing atmosphere. Within the scope of the invention, a conductive metal-oxide layer must be understood to mean a layer which comprises an oxide or oxides of a metal or of a mixture of metals and which is capable of conducting electric current.

As regards the known method and methods of applying conductive layers in general, the relatively high resistance and the instability of the conductive layer constitute a problem.

Although conductive layers manufactured in accordance with the known method have a lower resistance than conductive layers manufactured by earlier methods, their resistance is still relatively high for specific applications and they often exhibit, as a function of time, an instability in the conductivity. In general, the conductivity decreases as a function of time. A decrease in conductivity causes a reduction of the shielding and anti-static function of the conductive layer. A reduction of the resistance leads to an improvement of the shielding effect.

SUMMARY OF THE INVENTION

It is an object of the invention to provide a method of the type mentioned in the opening paragraph, which method leads to a reduction of one or more of the above problems and, in particular, to an improved shielding effect.

To achieve this, the method in accordance with the invention is characterized in that the surface is provided with a layer comprising a metal-salt or a mixture of metal salts, whereafter the layer is brought into contact with a solution to form metal-hydroxides, after which the layer is subjected to a thermal treatment.

By bringing the layer into contact with the solution, a reaction of the metal-salt(s) with the (e.g. alkaline solution); solution causes metal-hydroxides to be formed in situ (i.e. in the layer), which metal-hydroxides are converted in situ to conductive metal-(di)oxides by the subsequent thermal treatment. In comparison with conductive layers manufactured according to the known method, the resultant conductive layers exhibit a relatively low resistance and an increased stability. The increase in stability can probably be attributed to the reaction with the (e.g. alkaline) solution and the relatively low porosity of the conductive layers formed.

Preferably, the layer comprises a salt or a mixture of salts of one or more of the metals indium, tin and antimony.

The oxides of these metals exhibit a good conductivity.

A preferred embodiment of the method in accordance with the invention is characterized in that the layer is applied to the surface in the form of a salt-solution.

Sol/gel solutions as used in the known method are generally instable and exhibit poor keeping properties. This means that the preparation, storage and processing of the solutions requires great care and that, preferably, a relatively small quantity of the solution is available from stock, the sol/gel solution has to be prepared at a small distance from the device used to carry out the method, and the time period between the preparation and the use of said solution should be as small as possible. Such conditions lead to a substantial increase in cost, and there is a substantial risk that, despite due care, the solution and hence the conductive layer do not meet the quality requirements.

Salt solutions are more stable than sol/gel solutions and hence exhibit better keeping properties. In addition, by applying the salt layer as a solution, a proper distribution of the salt or salts over the surface of the substrate can be achieved.

For the salts, use is preferably made of carbonates, nitrates, chlorides, acetates, acetyl acetonates and/or formiates.

For the solution use is preferably made of e.g. an ammonia solution or a hydrogen-peroxide solution.

These salts and alkaline solutions have the advantage that no, or hardly any, residual products remain in the conductive layer.

BRIEF DESCRIPTION OF THE DRAWING

In the drawings.

The Figures are schematic and not drawn to scale; in general, like reference numerals refer to like parts.

DETAILED DESCRIPTION OF THE INVENTION

Figure 1:
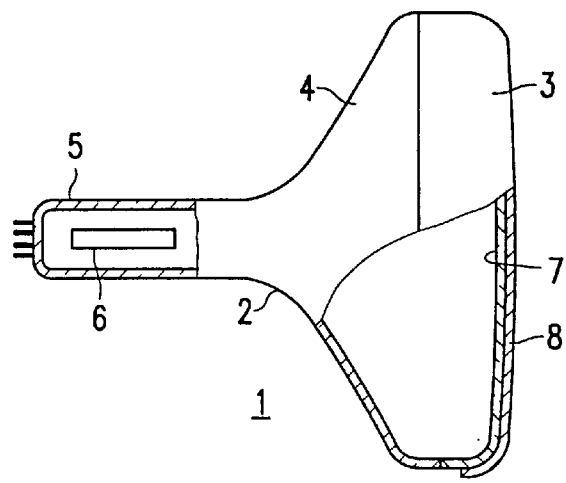
FIG. 1 shows a cathode ray tube.

The invention will now be described in greater detail with reference to the figures of the drawing.

FIG. 1 is a schematic, cut-away view of a cathode ray tube 1 with a glass envelope 2 comprising a display screen 3, a cone 4 and a neck 5. Said neck accommodates an electron gun 6 for generating an electron beam. This electron beam is focused on a phosphor layer on the inside 7 of the display screen 3. In operation, the electron beam is deflected across the display screen 3 in two mutually perpendicular directions by means of a deflection coil system (not shown). An anti-static coating 8 in accordance with the invention is applied to the outer surface of the display screen 3.

Figure 2:
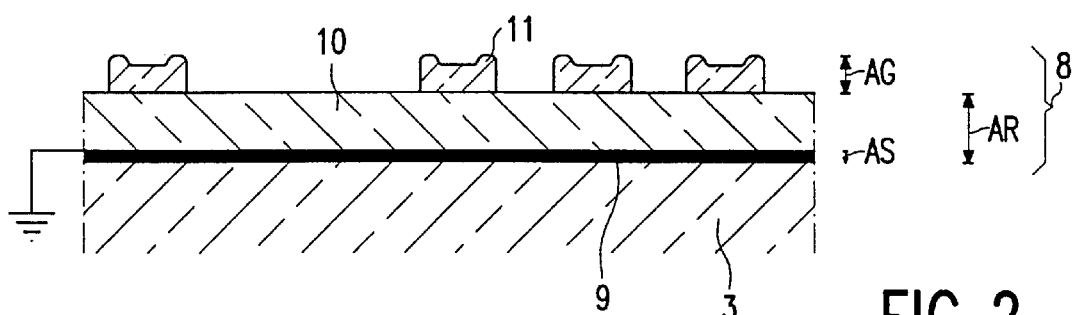
FIG. 2 illustrates an embodiment of a method in accordance with the invention.

FIG. 2 is a schematic, cross-sectional view of a display screen in accordance with an inventive embodiment. An anti-static coating 8 is applied to the display screen 3. This anti-static coating 8 comprises a first layer 9 (AS), a second layer 10 and, in this example, a third layer 11. The first layer 9 is prepared in accordance with the inventive method and comprises, in this example, tin-oxide. The second layer is made of silicon dioxide. The first layer and the second layer together form an anti-reflection filter (AR). For this purpose, the thickness of both layers 9 and 10 is, for example, approximately $\lambda/4$, where $\lambda$ ranges in the visible region, for example, between 500 and 600 nm. The second layer may be provided with polypyrrole-latex particles, enabling the transmission properties of the second layer to be determined. The third layer 11 (AG) is responsible for an anti-glare effect and is made, for example, of sprayed-on silicon dioxide.

Figure 3A:
FIGS. 3A. 3B and 3C further illustrate the method in accordance with the invention.
Figure 3B:
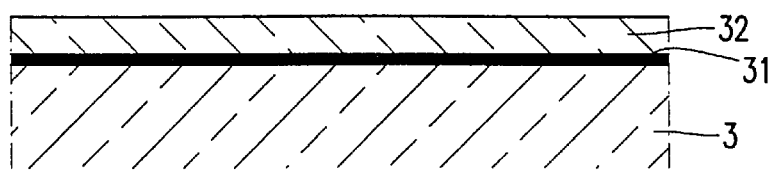
Figure 3C:
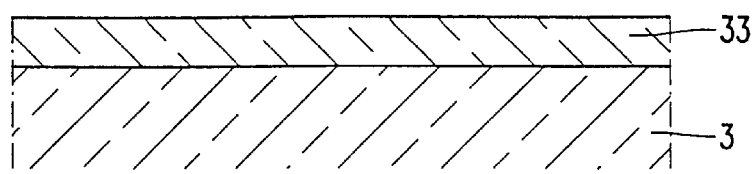

FIGS. 3A through 3C illustrate a method in accordance with the invention.

The method in accordance with the invention is characterized in that the surface 3 is provided with a layer containing a salt, whereafter the salt layer is brought into contact with an alkaline solution and, subsequently, subjected to a thermal treatment. In this example, a film of a salt solution 31 comprising a salt or a mixture of salts of indium and/or tin is provided, on the surface (FIG. 3) whereafter the film is fixed on the surface by a thermal treatment (for example drying). The salt layer (that is, a layer comprising a metal-salt) is subsequently brought into contact with an alkaline solution, for example, an ammonia solution 32 (FIG. 3B) whereafter the layer is subjected to a further thermal treatment. In the course of this further thermal treatment, the volatile constituents disappear and a conductive layer 33 is formed (FIG. 3C).

Salt solutions are more stable than sol/gel solutions. The salt solutions may be solutions, inter alia, of carbonates, nitrates, acetates, acetyl acetonates, formiates, for example, of indium, tin, indium-tin, antimony or mixtures thereof. A film of the solution may be applied, for example, by means of flow-coating, curtain-coating, spinning or spraying. Also after fixing (drying), a salt solution is more stable than a sol/gel solution. A salt solution can be fixed by means of hot air, in a furnace, by means of a laser or otherwise. The salt layer may also be provided in a different manner, for example, by spreading very fine salt powder over the surface. However, the use of a salt solution has the advantage that a uniform or substantially uniform distribution of the salt layer over the surface can be readily achieved. A non-uniform distribution of the salt layer results in inhomogeneities of the resistance of the conductive layer, which adversely affects the shielding effect.

The relatively low resistance and the high stability of the layers formed can possibly be attributed to a reaction between the alkaline solution and the salt or the salt mixture, which probably leads to a conversion of the salts into metal hydroxides (for example, indium, tin or indium-tin hydroxides). The subsequent, further thermal treatment, for example by means of hot air, in a furnace or, preferably, by means of a laser leads to a conversion of the (non-conductive or low conductive) hydroxides into electroconductive oxides, for example ITO (indium-tin oxide) or ATO (antimony-doped tin oxide). The resultant conductive layers exhibit a relatively low surface resistance and an increased stability. Said increase in stability can probably be attributed to the reaction between the salts and the alkaline solution, and the relatively low porosity of the conductive layers thus formed. The alkaline solution may be, for example, an ammonia solution or ammonia vapors or a hydrogen-peroxide solution, and may be a liquid or a gas.

Subsequently, a description will be given of a few examples in accordance with the invention.

EXAMPLE 1

A solution of $In(NO_3)_3$ is prepared in ethanol. The solution comprises 0.15 M $In(NO_3)_3$, 0.3 M acetate acid (HAc) and 0.015 M $SnCl_4$. The solution is subsequently applied to a substrate by spin-coating. For the substrate use can be made of Corning 7059 or Schott AF45 borosilicate glass. The spinning rate ranges, for example, between 400 and 800 rpm (revolutions per minute). Subsequently, the substrates provided with a film of said solution are heated, in succession, for 5 minutes at 150° C., 2 minutes at 300° C. or 1 minute at 500° C., whereafter they are immersed in a 6% ammonia solution and, subsequently, cured by heating (30 minutes) in air at 550° C. and 15 minutes in a forming gas at 325° C. The following chemical reactions probably occur:

metal-salt+base gives metal hydroxide+salt, the subsequent thermal treatment brings about a thermal decomposition leading to the formation of a conductive oxide layer and further, preferably volatile, constituents.

EXAMPLE 2

A solution of In(AcAc) (indium acetate) is prepared in ethanol. The solution comprises 0.15 M $In(AcAc)_3$, 0.3 M $HNO_3$ and 0.015 M $SnCl_4$. The solution is subsequently spun onto a substrate. For the substrate use can be made of Corning 7059 or Schott AF45 borosilicate glass. The spinning rate ranges, for example, between 400 and 800 rpm (revolutions per minute). The substrates provided with a film of said solution are subsequently heated, in succession, for 5 minutes at 150° C., 2 minutes at 300° C. or 1 minute at 500° C., whereafter they are immersed in a 6% ammonia solution and, subsequently, cured by heating (30 minutes) in air at 550° C. and in a forming gas at 325° C. for 15 minutes.

EXAMPLE 3

A solution as described in example 1 is spin-coated (spinning rate 200 rpm) onto a display window of a cathode ray tube. The solution is dried by scanning it with a heating laser. In this process, a dried layer containing salts is formed. Subsequently, a 5 M ammonia mist is sprayed over the dried layer. Next, the layer is cured by means of a laser. For this purpose, the layer is scanned by means of a laser beam.

Immediately after the conductive layers have been formed in accordance with the above method, they exhibit a surface resistance which is generally below 1000 Ohm, customarily in the range from 200 to 500 Ohm (said resistance values always are square resistance values). Conductive layers made in accordance with the known method have surface resistances of the order of 1000–10,000 Ohm or higher. Apart from the surface resistance of the layer immediately after the conductive layer has been formed, also the variation of the surface resistance is an important aspect. In general, the surface resistance of a conductive layer is not constant but varies as a function of time, with, in general, the resistance increasing from a lower initial value to a more or less stable final value. As regards conductive layers made in accordance with the inventive method, the surface resistance generally increases by a factor of 2 to 4, the increase being smaller as the initial value is lower. At an initial resistance also value below 500 Ohm, the resistance increases by a factor of 2–3, at a higher initial resistance value, the resistance increases by a factor of 3–4. In the known method, the surface resistance increases by a factor of 5–20, so that the final resistance is much higher than 1000 Ohm.

The generally lower surface resistance of the conductive layers made in accordance with the inventive method can possibly be attributed to the higher density of the layer and the larger grain size. Conductive layers made by means of wet-chemical processes generally exhibit a granular structure. The interfaces between the grains are an important factor as regards the value of the surface resistance. Investigations by means of a transmission-electron-microscope have revealed that the reaction with an alkaline solution leads to an increase of the average grain size in a layer and to a higher density. This may be responsible for the substantial reduction in surface resistance relative to the known method. The use of an alkaline solution has a positive effect on the initial resistance and on the final surface resistance.

Preferably, the conductive layer is covered with a sealing layer, such as a second conductive layer and/or a silicon-dioxide layer. Such sealing layers lead to a reduction of the initial resistance and/or the degradation (increase of the surface resistance as a function of time) of the surface resistance. This positive effect is illustrated by the following example:

A conductive layer is manufactured in accordance with one of the above examples. The initial resistance is approximately 500 Ohm. After 50 hours, the surface resistance has increased to a stable value of 2000 Ohm. For comparison, subsequently a conductive layer is formed and covered with a second layer in accordance with one of the above examples. The initial resistance of the double, conductive layer thus formed is approximately 200 Ohm. After 50 hours, the surface resistance has increased to a stable value of approximately 500 Ohm. Consequently, the final surface resistance has decreased by a factor of 4.

For the salts use is preferably made of carbonates, nitrates, chlorides, acetates, acetyl acetonates and/or formiates.

For the solution use is preferably made of an alkaline solution, e.g. an ammonia solution or of hydrogen-peroxide solutions.

These salts and alkaline solutions have the advantage that no, or hardly any, residual products remain in the conductive layer.

It will be obvious that within the scope of the invention many variations are possible to those skilled in the art.

The invention can be summarized as follows:

A conductive layer comprising metal-oxide or metal-oxides is applied to a substrate by providing a layer comprising a metal-salt or a mixture of metal-salts on the substrate, bringing the layer into contact with an alkaline solution, and, subsequently, subjecting the layer to a thermal treatment (heating).

The layer comprising metal-salts is preferably provided as a salt solution which is subsequently dried.

We claim:

1. A method for applying a conductive, transparent metal-oxide layer to a surface of a substrate, characterized in that the surface is provided with a layer comprising a metal-salt or a mixture of metal salts, whereafter the layer is brought into contact with an alkaline or hydrogen peroxide solution to form metal-hydroxides, after which the layer is subjected to a thermal treatment.

2. A method as claimed in claim 1, characterized in that the layer comprises at least one salt of a metal selected from the group consisting of indium, tin and antimony and mixtures thereof.

3. A method as claimed in claim 2, characterized in that, before the layer is brought into contact with the alkaline solution, it is fixed onto the surface.

4. A method as claimed in claim 1, characterized in that the layer is applied to the surface in the form of a salt-solution.

5. A method as claimed in claim 4, wherein the salt solution comprises at least one salt of a metal selected from the group consisting of indium, tin, and antimony.

6. A method as claimed in claim 4, wherein the salt solution comprises a salt selected from the group consisting of carbonates, nitrates, chlorides, acetates, acetyl acetonates and formiates.

7. A method as claimed in claim 1, characterized in that the conductive transparent layer formed is covered with a further conductive layer.

8. A method as claimed in claim 1, characterized in that the conductive layer is provided on a display window of a cathode ray tube.

9. A method of applying a conductive, transparent metal-oxide comprising layer to a surface of a substrate, characterized in that the surface is provided with a layer comprising a metal-salt or a mixture of metal-salts, whereafter the layer is brought into contact with an alkaline solution, after which the layer is subjected to a thermal treatment.

10. A method as claimed in claim 9, characterized in that the alkaline solution comprises ammonia.

11. A method as claimed in claim 9, characterized in that the layer comprises at least one salt of a metal selected from the group consisting of indium, tin and antimony and mixtures thereof.

12. A method as claimed in claim 9, characterized in that the layer is applied to the surface in the form of a salt solution.

* * * * *